United States Patent [19]

van de Nieuwelaar

[11] Patent Number: 4,597,133
[45] Date of Patent: Jul. 1, 1986

[54] DEVICE FOR TRANSFERRING SLAUGHTERED POULTRY

[75] Inventor: J. A. van de Nieuwelaar, Germert, Netherlands

[73] Assignee: Stork PMT B.V., Boxmeer, Netherlands

[21] Appl. No.: 699,953

[22] Filed: Feb. 8, 1985

[30] Foreign Application Priority Data

Feb. 10, 1984 [NL] Netherlands ................. 8400447

[51] Int. Cl.$^4$ ............................................. A22C 21/00
[52] U.S. Cl. ............................................. 17/24; 17/11; 198/476.1
[58] Field of Search .................. 17/11, 24; 198/435, 198/456, 598, 605, 476.1, 483.1, 485.1, 486.1

[56] References Cited

U.S. PATENT DOCUMENTS 4,034,440 7/1977 Van Mil ........................... 17/24
4,178,659 12/1979 Simonds .......................... 17/24

FOREIGN PATENT DOCUMENTS 0049689 4/1982 European Pat. Off. .

Primary Examiner—Willie G. Abercrombie
Attorney, Agent, or Firm—Newton, Hopkins & Ormsby

[57] ABSTRACT

Device for transferring slaughtered poultry from a first conveyor track having first suspension hooks, to a second conveyor track, having second suspension hooks, with an input station for introducing the birds into transfer units on a transfer track between the first and second conveyor track, and with an output station, for transferring the birds from the transfer units to the second hooks, the input station being provided with overhanging units moving in a closed track, synchronized with the movement of the suspension hooks and each overhanging unit provided with an overhanging member moving in front of the suspension hooks and transfer hooks.

10 Claims, 20 Drawing Figures

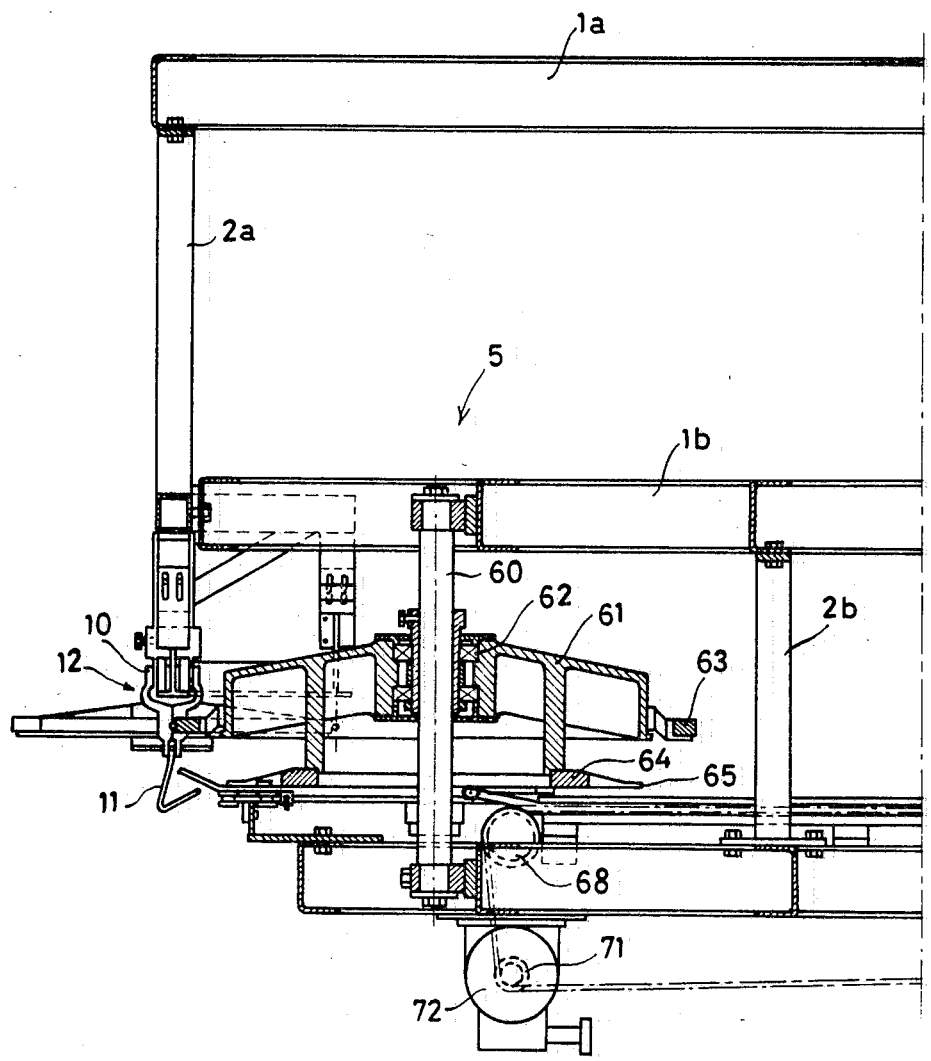
FIG: 1a.

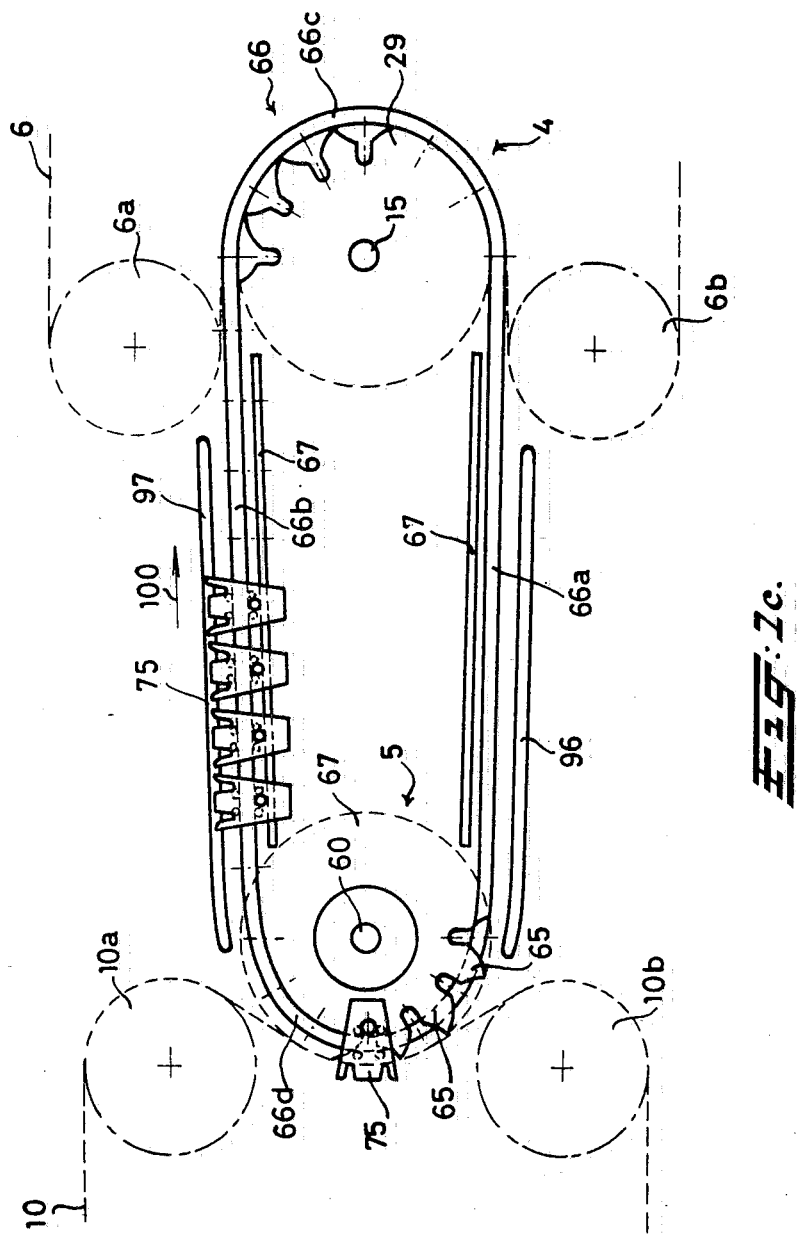

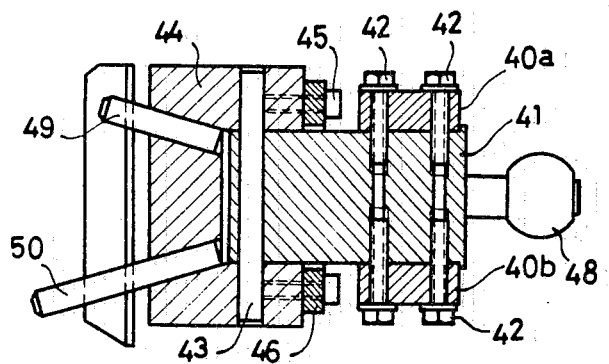
FIG:2c.
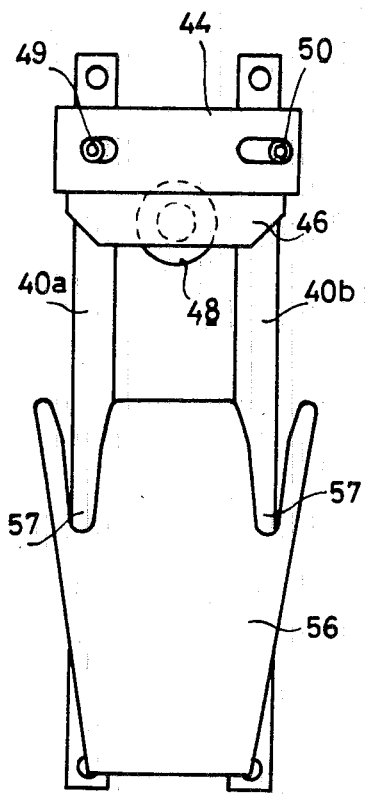
FIG:2a.
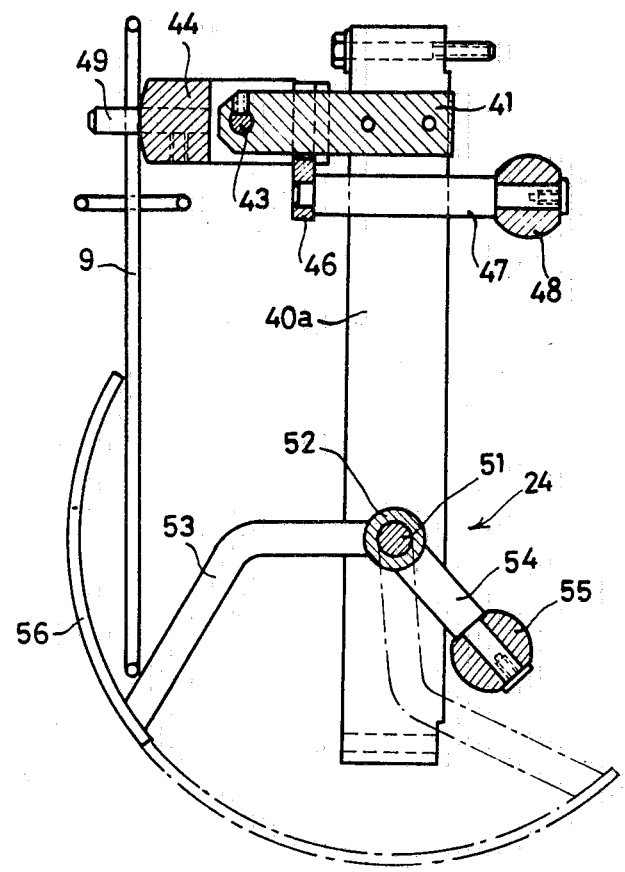
FIG:2b.

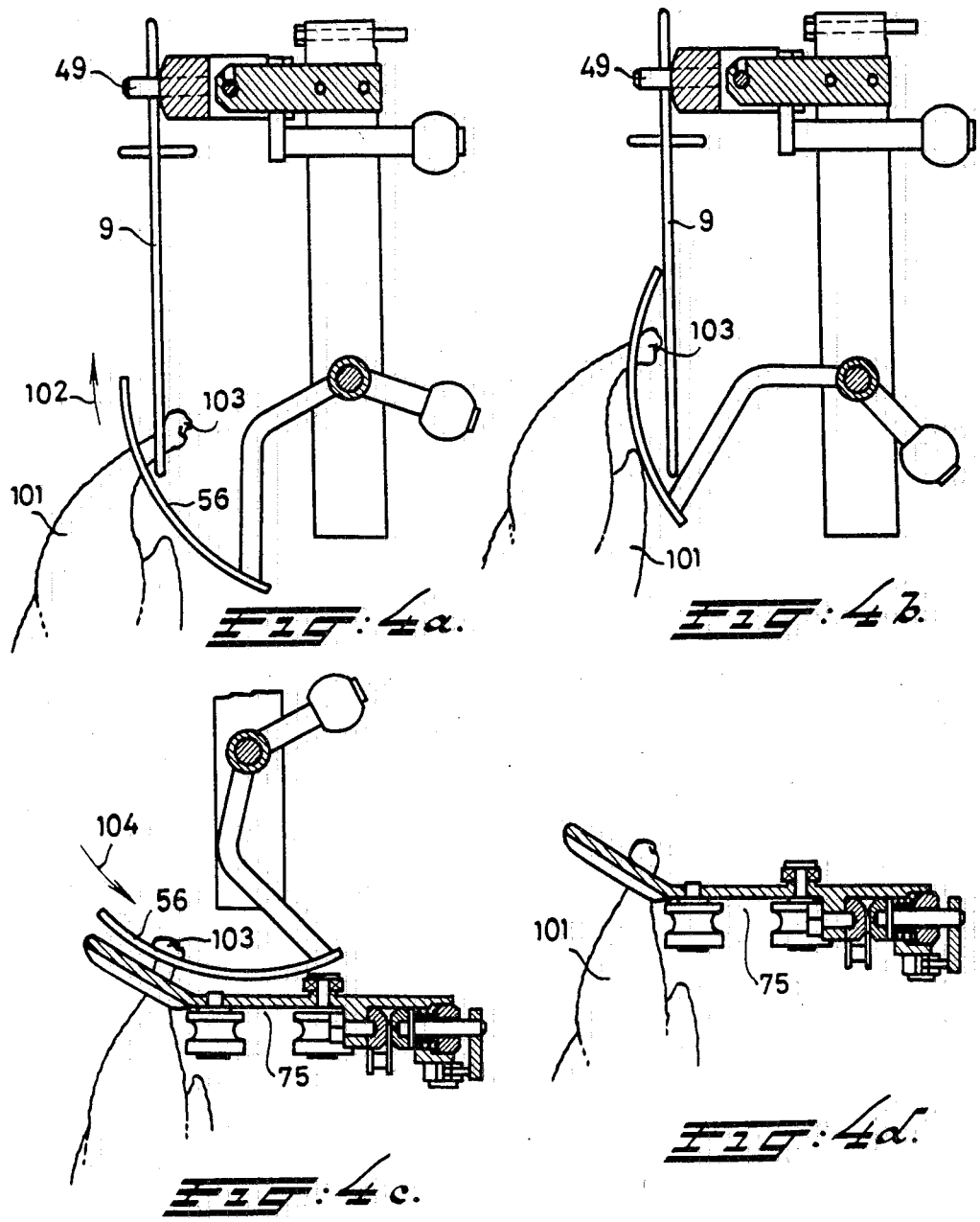

DEVICE FOR TRANSFERRING SLAUGHTERED POULTRY

BACKGROUND OF THE INVENTION

The invention relates to a device for transferring slaughtered poultry from a first conveyor track having first suspension hooks, engaging on the knee-stumps of the birds, to a second conveyor track, having second suspension hooks, also engaging on the knee-stumps of the birds, with an input station adjoining the first track, for introducing the birds into transfer having reception members which protrude from a transfer track running between the first and second conveyor track and having an output station, adjoining the second track, for transferring the birds from the transfer units to the second hooks, the transfer units each being constructed with two reception slots, located next to one another, for receiving the upper legs of the birds.

DESCRIPTION OF THE PRIOR ART

A device of this type is known from Netherlands Patent Application No. 82/02180 in in the name of the applicant. In this known device the birds supplied hang by the ankle joints in the suspension hooks of the so-called slaughter line and have in this undergone the process of removal of feathers and head; they are transferred by the device to the so-called eviscerating line, along which they are transported with the knee stumps hanging in other hooks, for, inter alia, the removal of the entrails.

This known transfer device has a cutting device for cutting through the knee joints of the birds, whereby the release of the legs from the slaughter hooks is made simple; in fact, during cutting-through of the knee joints the knee stumps are introduced into the transfer unit. This known device accordingly does not provide a solution to the problem of how slaughtered poultry which hangs by the knee stumps in suspension hooks can be brought onto other suspension hooks in which they must also hang by the knee-stumps.

A situation of this type presents itself, for example, with the transfer of birds from the above-mentioned eviscerating line to the refrigeration line. Because the bird in this refrigeration line does not undergo any processes whereby force is brought to bear on it, the hooks of the refrigeration line can be considerably shorter and simpler than those of the eviscerating line, so that optimum use can be made of the capacity of the refrigeration chamber through which the birds are moved in several layers.

SUMMARY OF THE INVENTION

There is thus a need for a device by which the birds can be transferred from the oven-ready hooks in which they lie well-fixed in relatively long reception slots, to other hooks.

The invention provided such a device. According to the invention this device is characterized in that the input station is provided with a plurality of overhanging units moving in a closed track, the movement of which is synchronised in such a way with the movement of the suspension hooks moving in front of it and the transfer units moving below it that the respective positions thereof always coincide over a portion of the track thereof, and each overhanging unit is provided with an overhanging member, itself provided with two reception slots, the member being caused to move to and fro in such a manner about a horizontal axis in a vertical plane in front of the suspension hooks and transfer hooks that during the upward movement the legs of the birds are raised out of the suspension hooks by the reception slots and at the end of the subsequent downward movement are placed in the reception slots of a transfer unit.

The overhanging member ensures, during the upward movement, that the legs of the birds are lifted out of the suspension hooks of the first track; during the downward movement the legs initially remain suspended in the overhanging member and are subsequently placed in a transfer unit.

Both processes are carried out with great reliability; the birds are thereafter successively brought to the second track via the transfer units.

Preferably, both the input station and the output station are provided with a rotating guide synchronised with the speed of the first and second track respectively, the guide having guide members cooperating with the respective transfer units alternately, in such a way that over at least a part of the track of the transfer units along the respective stations the speed and position of these units are determined by the guide members while between these stations the transfer units are driven slidingly and at a higher speed.

This measure makes it unnecessary for the speed of the input station and output station to be exactly matched to one another; as long as the output station is not driven at a lower speed the device will always work well.

Further advantageous embodiments of the invention are specified in the sub claims; they are explained with the aid of the following description of the figures, in which:

SURVEY OF THE DRAWINGS

FIG. 1a shows, partly in elevation and partly in cross-section, the output station of the complete installation according to the invention;

FIG. 1b shows, partly in elevation and partly in cross-section, the input station of this installation;

Figure 2B:
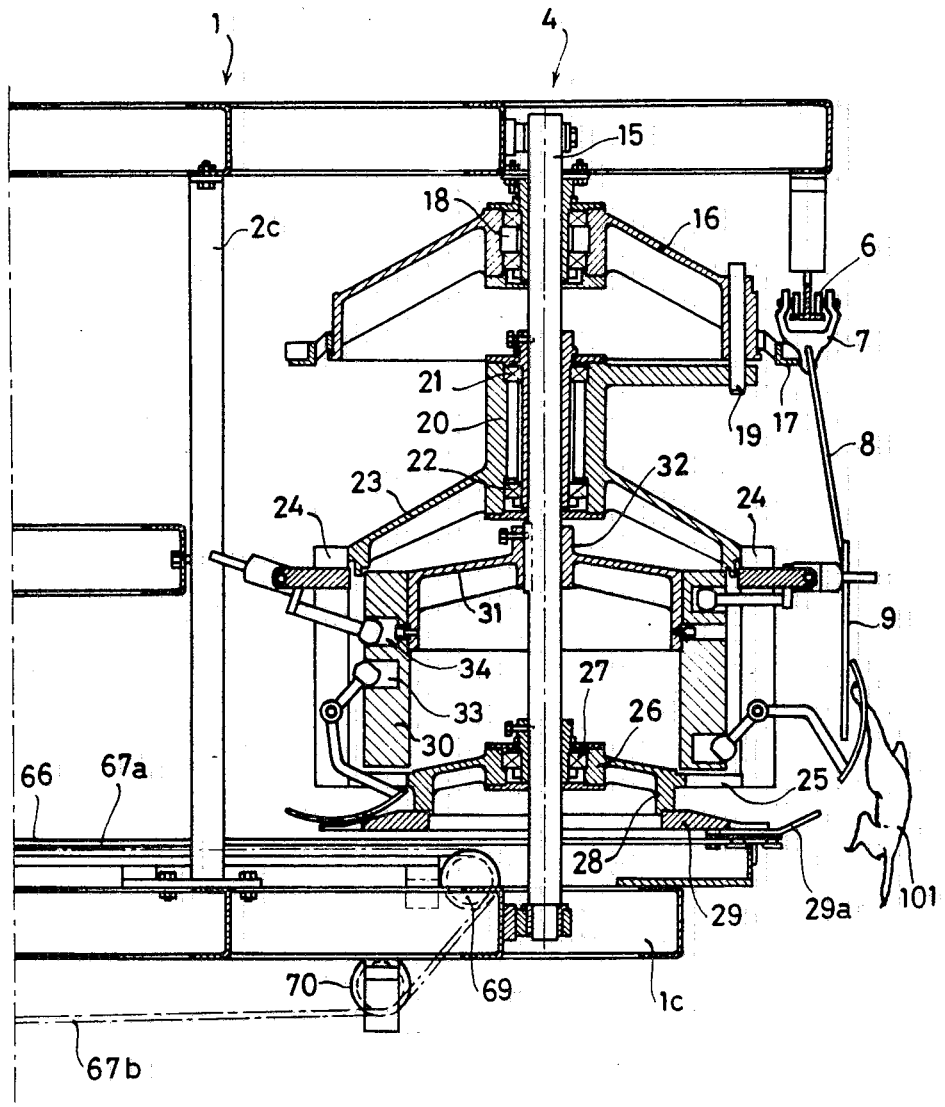
Figure 3A:
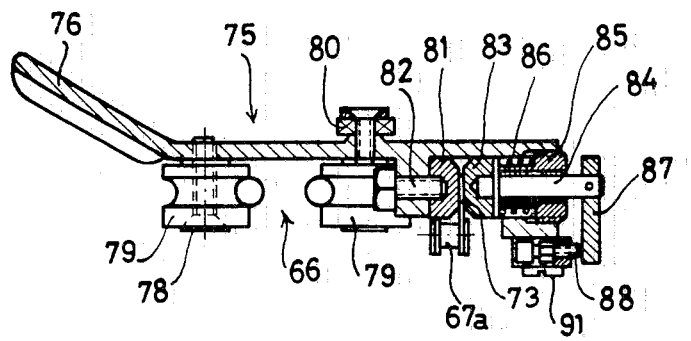
Figures 3B, 3C:
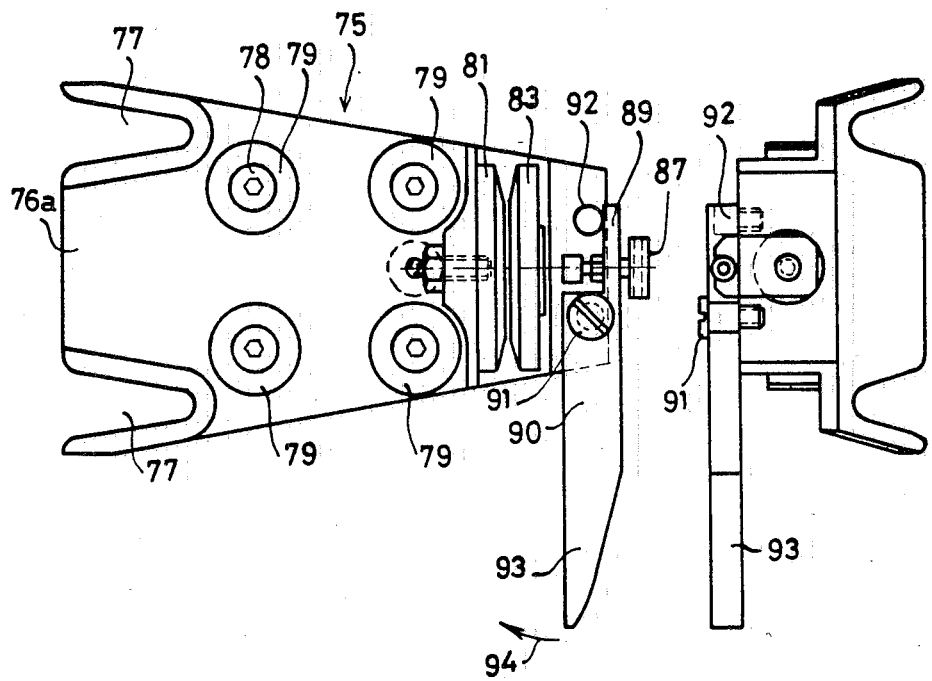
Figure 5:
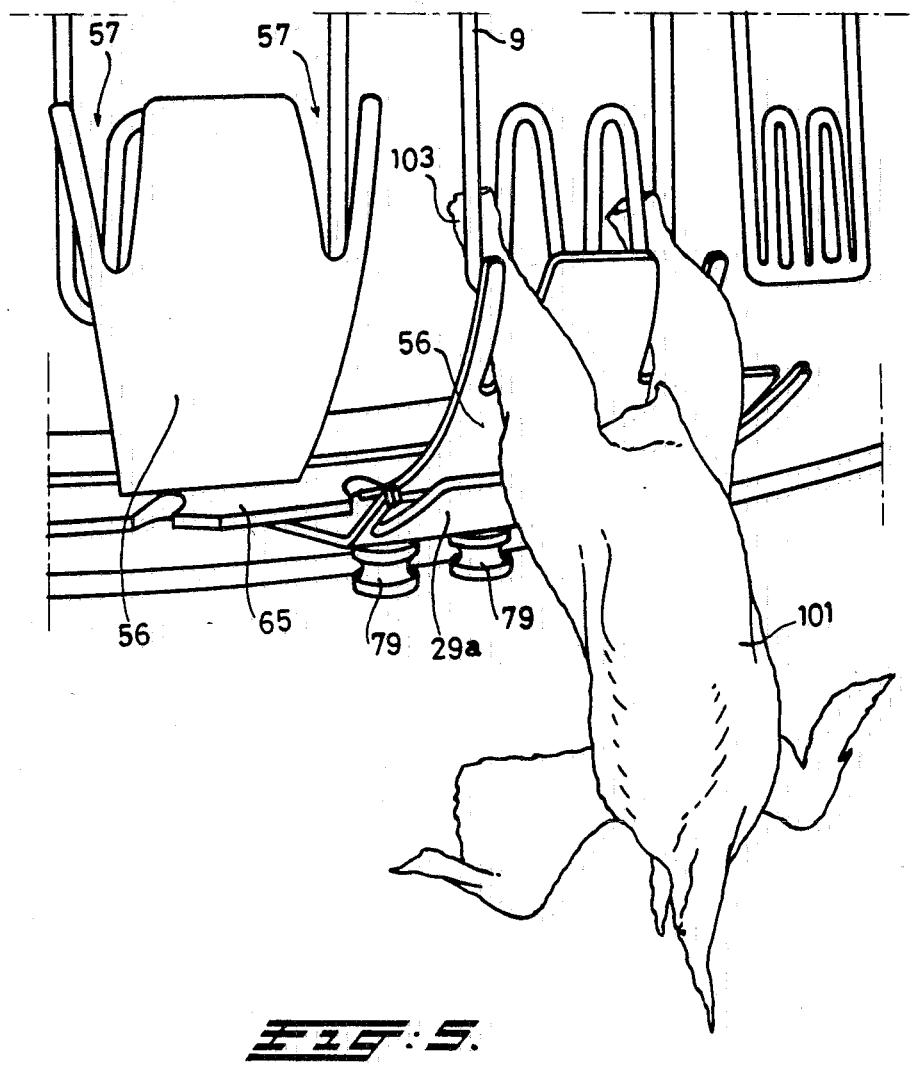
Figure 6:
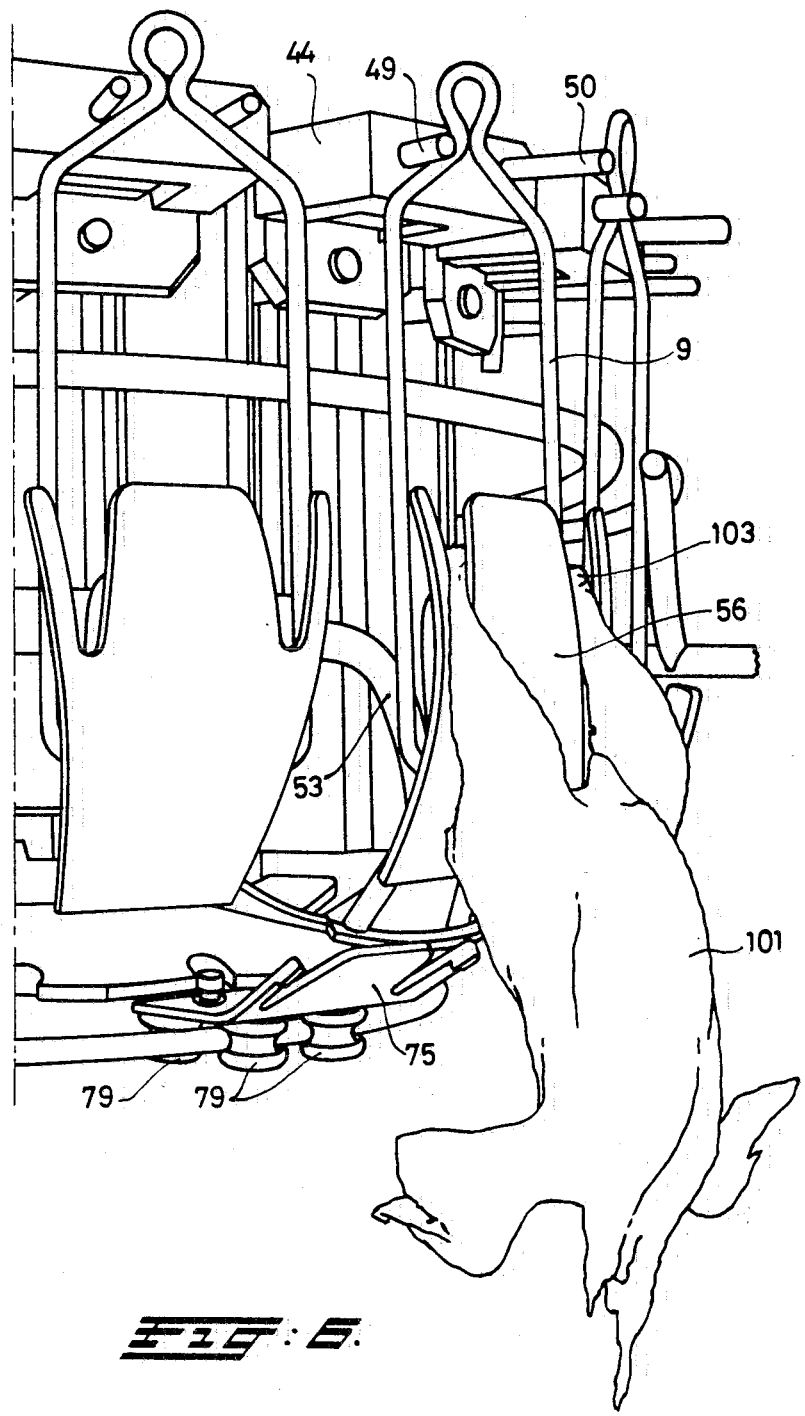
Figure 7:
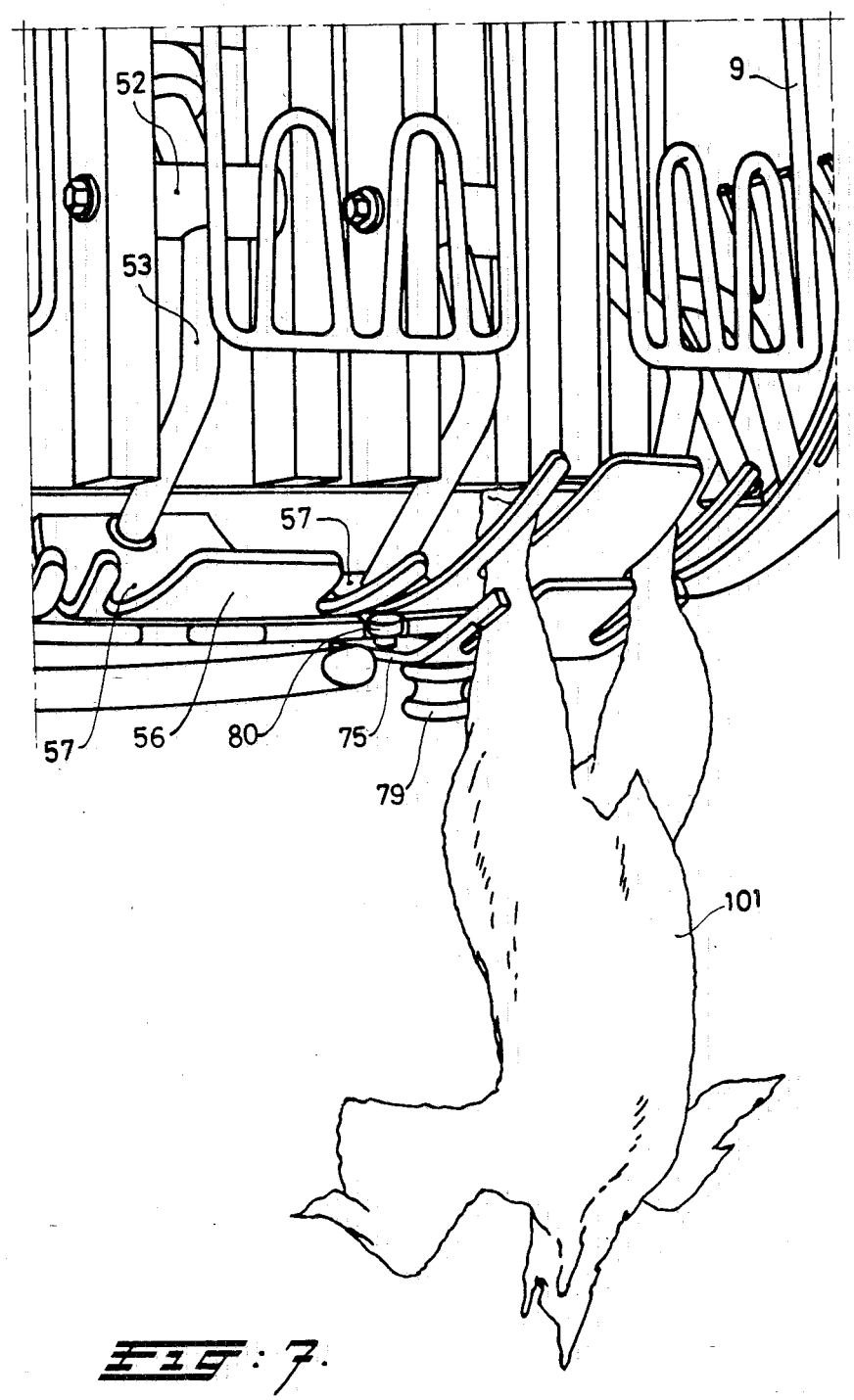
Figure 8:
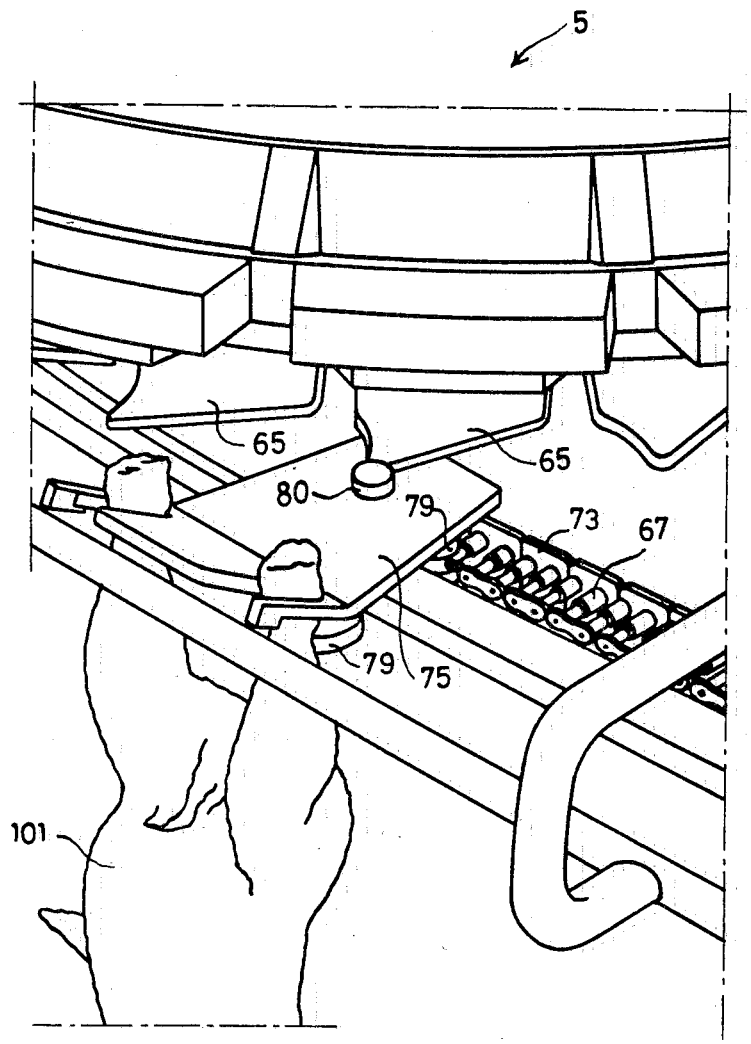
Figure 9:
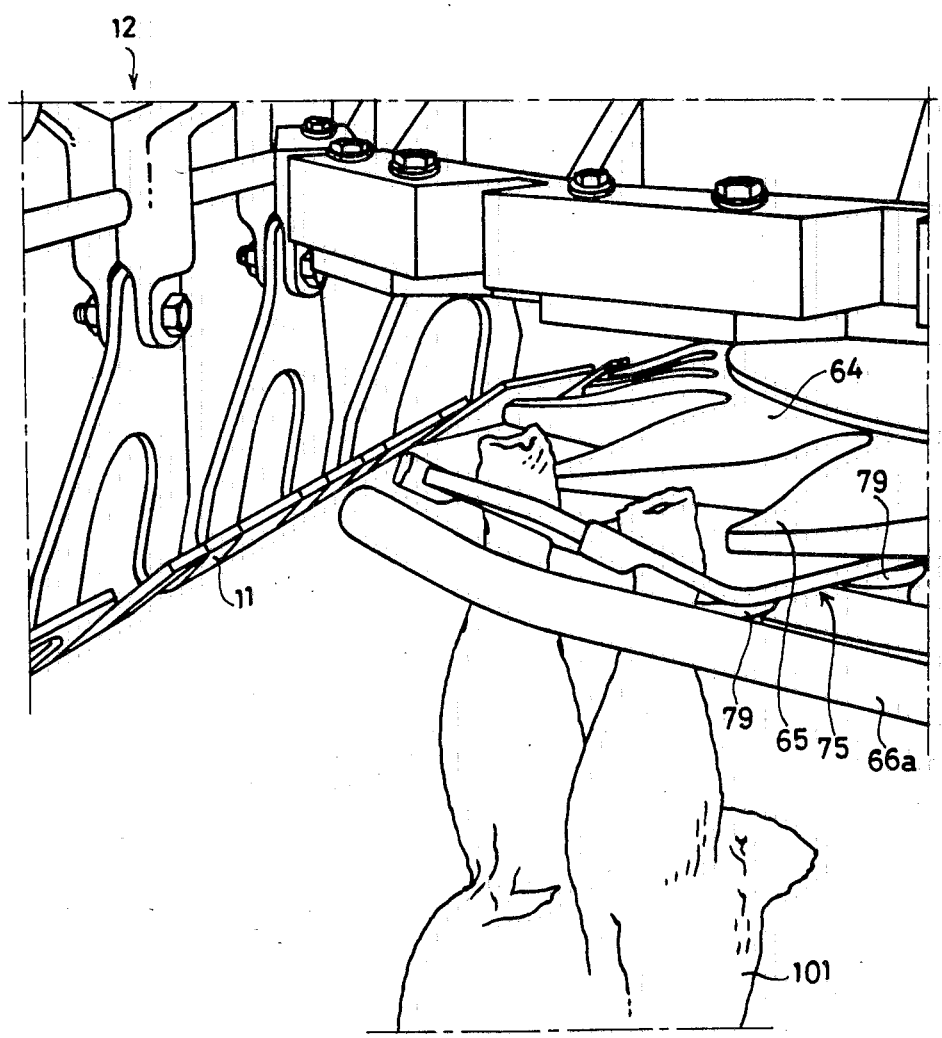
Figure 10:
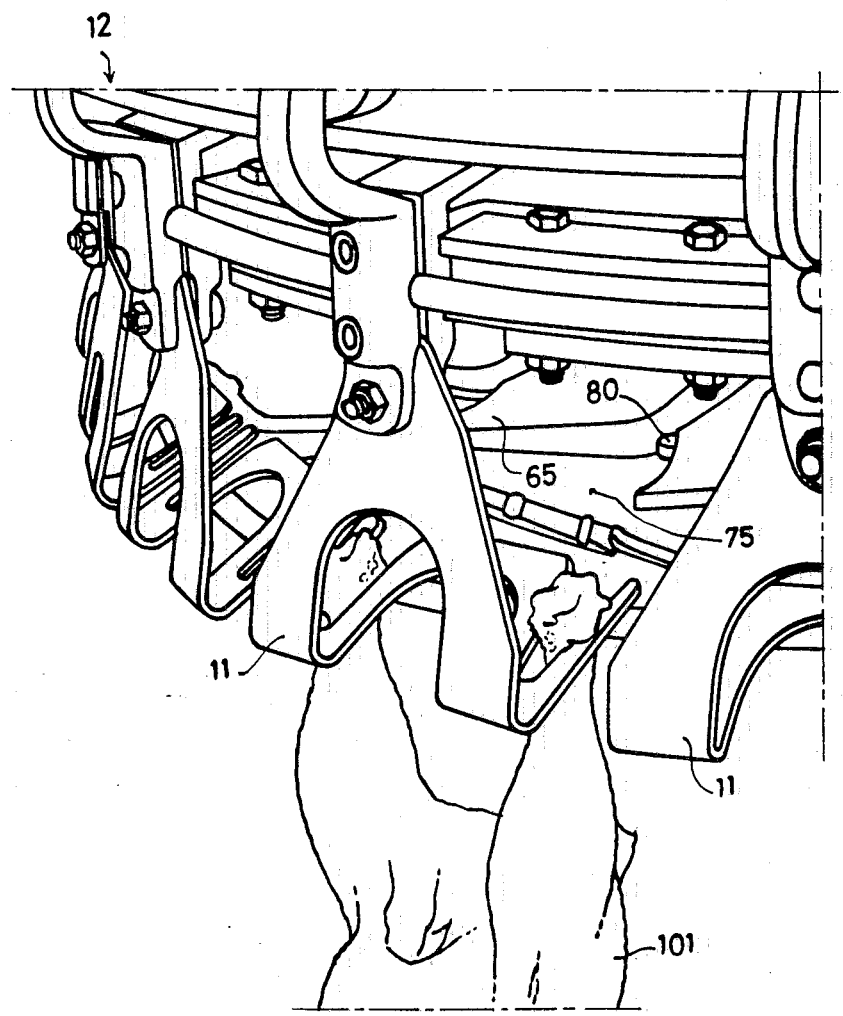
Figure 11:
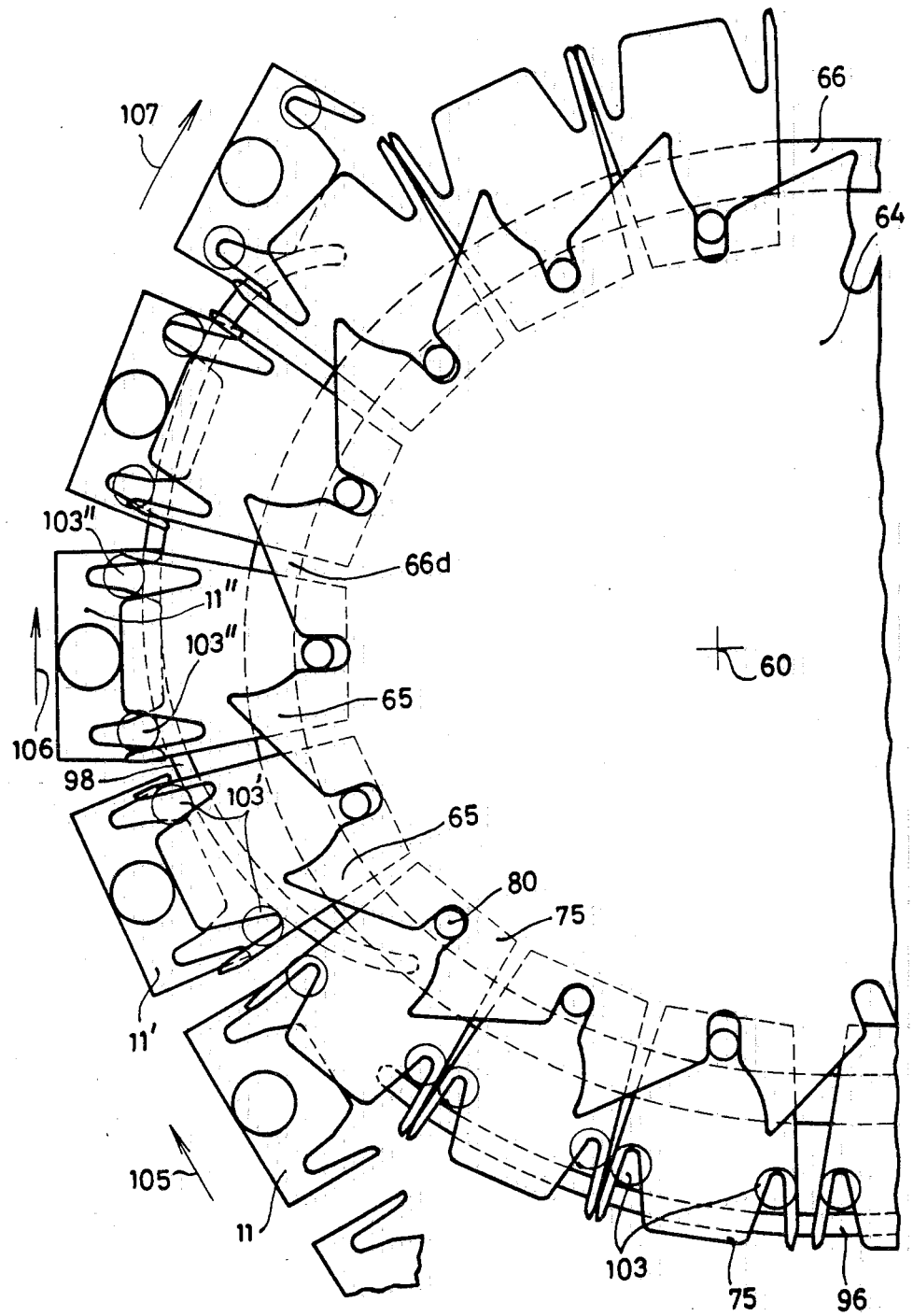

FIG. 1c diagrammatically shows the various tracks;

FIG. 2a shows a front view of an overhanging unit;

FIG. 2b shows a side view of an overhanging unit;

FIG. 2c shows a top view of an overhanging unit;

FIG. 3a is a half-view/half-cross-section of a transfer unit employed in the device according the invention;

FIG. 3b is a top view of this unit;

FIG. 3c is an end view of this unit;

FIG. 4a to 4d inclusive clarify the working of the transfer unit;

FIGS. 5, 6 and 7 are perspective illustrations to explain the working of the overhanging station;

FIGS. 8 to 10 inclusive show various stages of the transfer of a bird from a transfer unit to a hook of the second transport track;

FIG. 11 diagrammatically shows the cooperation between transfer units and the hooks of the second transport track.

DESCRIPTION OF PREFERRED EMBODIMENTS

The device as depicted in FIGS. 1a and 1b comprises a frame indicated in its entirety by the reference numeral 1, which frame has a horizontal beam 1a, 1b and 1c and vertical stays 2a, 2b and 2c. The frame supports the various elements of the input station and the output station as well as the track sections present between them and does not need further explanation. Naturally, other configurations are also possible.

Accommodated in the frame are the input station 4, shown in detail in FIG. 1b, and the output station 5, shown in detail in FIG. 1a.

The input station 4 cooperates with the transport track 6 which is led over the guide wheels 6a and 6b (see FIG. 1c) and wherein the birds hang in the usual hooks 9 via the usual trolleys 7 and connector 8; in the refrigeration track 10, which is led over the guide wheels 10a and 10b (see FIG. 1c), the birds hang in the short refrigeration hooks 11 which are carried directly by the trollys 12. The hooks 11 are significantly shorter than the slaughter hooks 9 so as to make optimum possible use of the space in the refrigeration unit.

The input station 4 comprises the stationary central shaft 15 around which various parts are attached. At the top there is the driver drum 16 which cooperates via drivers 17 with the trolleys 7 and is thus driven by the slaughter line; the drum is mounted in the bearings 18. The drum 16 is coupled via the drivers 19 to the tube 20 which is mounted in the bearings 21 and 22 and carriers, on its underside, the radial conical cylinder 23 wherein the overhanging stations 24 are fixed. The construction of the overhanging stations is discussed in detail with reference to FIGS. 2a-2c. Each overhanging station is attached on its underside to a radial carrier 25 which is itself fixed to the hub 26 which is mounted in the bearing 27 and is connected with drivers 29a, separated by cut-outs, the working of which drivers will still be explained in more detail in the text which follows.

Around the shaft 15 there is the stationary drum 30 which is fixed via the carrier 31 and the flange 32 to the shaft 15; on its outer surface, this drum is provided with two control curves of variable height, running along the periphery and indicated by 33 and 34.

The construction of an overhanging unit is reproduced in detail in FIGS. 2a-2c. Each unit consists of two carriers 40a, 40b (optionally replaceable by a single member), between which, at the top, there is clamped the connector 41 which is provided with a screw thread for receiving the fixing bolts 42. In this connector there is mounted, via the shaft 43, the tilting member 44 which is connected via the bolts 45 to the short arm 46 which in turn is connected to the control arm 47 with control cam 48, the last-mentioned cooperating with the upper control curve 34; at the front face, the tilting member 44 carries a short pressure pin 49 and a long pressure pin 50. These cooperate, in a manner to be described later, with the suspension hooks 9.

On the underside, between the carriers 40a, 40b, there is accommodated a tilting shaft with, around it, the bearing tube 52 which carries, firstly, the bent tilting arm 53 and, secondly, the short control arm 54 with control cam 55. The last-mentioned cooperates with the bottom control curve 33. The arm 53 carries the plate-shaped overhanging member 56, the surface of which is bent in the shape of a segment of a circle and is provided with outward-diverging receiving slots 57. In the figure, the extreme positions of the overhanging member are shown with solid and broken lines respectively.

During operation, the overhanging units 24 rotate around the central shaft 15 and as a result of the cooperation of the control cams 48 and 55 respectively with the corresponding upper and lower control curve 34 and 33 respectively the hook-pressure and the overhanging member will execute swinging motions in a vertical plane. These will be explained in more detail later.

The output station 5 is of considerably simpler construction. It consists of the central shaft 60, fixed in the frame, about which the drum 6a can rotate in the bearings 62; the drivers 63 on the periphery of the drum cooperate with the trolleys 12 of the refrigeration line 10 and in this way drive the drum 61. The drum 61 carries, on its underside, the driver disc 64 with drivers 65, separated by cut-outs, for taking with them, and driving, the transfer hooks 75 which are still to be discussed.

These transfer hooks move along the stationary guide rails 66 attached along the periphery of the device, the course of the guide rails being indicated in FIG. 1c.

Moreover, in the frame there are two drive chains 67 each running along a long side of the device and intended for driving the transfer hooks moving from the input station 4 to the output station 5 and those which move back from the output station 5 to the input station 4. The first-mentioned chain can be seen in the figure and the long sections thereof are indicated by the reference numerals 67a, 67b; the chain passes over the guide rolls 68, 69, 70 and over the drive wheel 71 which is driven by a variable-drive motor unit 72. The chain carries driver plates 73 which protrude vertically from the links of the chain (see FIG. 3a) and which are intended to drive, with slip and with a higher speed than that of the transport belt, in the path between the input station 4 and the output station 5, namely in that section of the track where the movement of the transfer units is not determined by the driver discs 29 and 64 respectively.

The construction of such a transfer unit, which is marked with reference numeral 75, is shown in FIGS. 3a-3c. The unit consists of the body section 76, of which the front end 76a slopes upwards and is provided with the receiving slots 77. Further, it carries on the underside, via the pins 78, the guide roller 79, and, on the upper side, the driver roller 80 constructed as a ball bearing. On the underside there is a fixed driver cam 81, attached by means of the screw 82, and the movable driver cam 83, attached to the pin 84 which can slide in the guide member 85; between the guide member 85 and the driver cam 83 there is attached the main pressure spring 86. The end of the pin 84 carries the stop 87 which cooperates with the adjustment screw 88. The position of the latter determines the minimum distance between the drivers 81 and 83, this distance being set in accordance with the thickness of the driver plates 73 on the chain 67a.

The adjustment screw 88 passes through the end 89 of a lever 90 which can turn round the peg 91; this end 89 rests against the stop 92. When the other, chamfered end 93 of the lever 90 is turned in the direction of the arrow 94, the driver block 83 is moved, via the adjustment screw 88, the stop 87 and the pin 84, away from the fixed driver 81, so that the drivers are freed from the driver plates 73 on the drive chain. This occurs when two transfer units rest against one another on the track 66; the chamfered end 93 of the next (in the direction of travel) transfer unit comes up against the pin 92 of the proceding unit, whereby the end is swung in the direction of the arrow 94, the drivers 81, 83 of the overhanging hook in question are moved away from one another and the transfer unit is only driven slippingly or not at all by the drive chain 67.

The continuous guide rails 66 for the transfer units 75 have, between the input unit 4 and output unit 5, a rectilinear portion 66a and 66b respectively, and along this portion the transfer units are driven at a higher speed by the chains 67. Before the input station 4 there is a curved section 66c along which the transfer units are again driven by the drivers 29a of the said station, so that their movement is there synchronised with that of the overhanging stations, while at the output station 5 there is a curved portion 66d, and when moving along this the transfer units are driven by the drivers 65, so that there their movement is synchronised with that of the output station and of the refrigeration line. Along the straight sections of the path there are the fixed guides 96, 97, of which the end located near the output station is somewhat curved, and at the output station there is furthermore a special output guide 98 (see FIG. 11) which serves to press the legs of the birds out of the transfer units and into the hooks of the refrigeration line.

The transfer of the birds, arriving on the eviscerating line 6, from the hooks 9 to the transfer unit 75 is illustrated with references to FIGS. 4a–4d in combination with FIGS. 5 to 7 inclusive.

From the transfer unit 75 arriving via the track 66b in the direction of the arrow 100, the driver roller 80 drops, on approaching the overhanging station, into the space between two adjoining drivers 29a. Since the movement of the disc 29 with the drivers 29a is coupled with that of the track 6 and with that of the overhanging stations, a combination will always form between an eviscerating line hook 9 of the eviscerating line, which hook carries a bird 101, a particular overhanging station 24 and a transfer unit 75. These three elements move conjointly through the overhanging station; the hook 9 is fixed by the pressure pins 49 and 50 and the transfer unit by the drivers 29. During the movement, the motion of the various elements of the overhanging station are controlled by the control curves 33, 34 in the drum 30.

These control curves run in such a manner that during the greatest part of the movement the pressure pins 49 and 50 keep the hook 9 pressed so that a vertical movement thereof is impossible (see FIG. 6). The course of the control curve 33 is such that as soon as the three element: hook, overhanging station and overhanging hook are positioned relative to one another, first the overhanging member 56 executes a swinging movement from the lowest position in the direction of the arrow 102 (see FIG. 4a), and along underneath the hook 9, whereby the bird is tilted out of the hook and comes to hang with the knee-stumps 103 in the cut-outs 57. FIG. 5 shows the situation shortly before the knee-stumps 103 are released from the hook 9 and FIG. 6 the situation where the bird has been completely tilted out of the hook 9; this situation is also depicted in FIG. 4b. FIGS. 4a, 4b and 6 also show the mode of operation of the pressure pins 49 and 50. As the hook, overhanging station and transfer unit move further along the input station, the overhanging member moves back, namely in the direction of the arrow 104 in FIG. 4c. This brings the bird by its knee-stumps into the cut-outs 77 of the overhanging hook 75; FIG. 7 shows the situation which has then arisen. The overhanging member 56 then moves back further in the direction of the arrow 104 while the transfer unit/begins on the right-hand portion 66a of the track between the input station and the output station; the overhanging member and transfer unit move away from one another and the bird hangs safely in the transfer unit 75.

The overhanging can be further assisted by moving the guide 66 somewhat to the outside at the point of transition from the track portion 66c to the track portion 66a, thereby bringing the transfer unit 75 slightly forward.

The transfer unit 75 is now transported at higher speed, by the chain 67, to the output station 5. When it has arrived there, the driver roll 80 comes to lie between two drivers 65 and at the same time the drivers 81, 83 of the unit 75 are released from the drive chain 67, the further movement of the transfer unit along this station is now determined exclusively by the drivers 65 on the driver disc 64 and this movement is again directly coupled to that of the refrigeration line 10. This ensures that a refrigeration hook always comes to lie in front of a transfer unit 75.

The transfer of the birds from the transfer units to the refrigeration hooks is effected by means of the guide 98 (see FIG. 11). This is of such a shape that the distance of it from the shaft 60 gradually increases from the beginning to the end while the transfer units, while they travel on the track section which runs along the output station, maintain a constant distance from this shaft 60. The refrigeration hooks 11 approach the circle-segment track of the transfer units, from which the birds hang, tangentially (arrow 105), thereafter pass through a track portion, in the shape of a circle segment, where their distance from the shaft 60 remains constant (arrow 106) and then again follow a tangential outlet portion (arrow 107). The knee-stumps 103, initially held back by the guide 96, come free (see FIG. 11), from this guide and thereafter run up against the guide 98 as a result of which they are pressed into the refrigeration hooks 11', 11", as indicated by the reference numerals 103' and 103". This completes the transfer process.

The transfer unit 75, now free from birds, are transported onward by the drivers 65; at the transition from the track portion 66a to the track portion 66b they come free from the drivers and are brought by the chain 67 to the input station. When a number of transfer units lie there, one behind the other, to be introduced one by one, these transfer units will be driven slidingly by the co-operation of the levers 93 and the stop cams 92 (see FIGS. 3a–3c) thereby preventing wear.

What is claimed is:

1. Device for transferring slaughtered poultry from a first conveyor track having first suspension hooks, engaging on the knee-stumps of the birds, to a second conveyor track, having second suspension hooks, also engaging on the knee-stumps of the birds, with an input station adjoining the first track, for introducing the birds into transfer units having reception members which protrude from a transfer track running between the first and second conveyor track and having an output station, adjoining the second track, for transferring the birds from the transfer units to the second hooks, the transfer units each being constructed with two reception slots, located next to one another, for receiving the upper legs of the birds, in which the input station is provided with a plurality of overhanging units moving in a closed track, the movement of which is synchronised in such a way with the movement of the suspension hooks moving in front of it and the transfer units moving below it that the respective positions thereof alway coincide over a portion of the track thereof, and each overhanging unit is provided with an overhanging member, ifself provided with two reception slots, the member being caused to move to and fro in such a manner about a horizontal axis in a vertical plane in front of the suspension hooks and transfer hooks that during the upward movement the legs of the birds are raised out of the suspension hooks by the reception slots and at the end of the subsequent downward movement are placed in the reception slots of a transfer unit.

2. Device according to claim 1, in which each overhanging unit is provided with at least one blocking member which is rotatable about a horizontal axis, which member blocks any vertical movement of the suspension hooks during the movement along the input station.

3. Device according to claim 1, in which both the overhanging member and the blocking member are carried by a tilting arm which is connected to a control arm which cooperates with a stationary control curve.

4. Device according to claim 1, in which both the input station and the output station are provided with a rotating guide synchronised with the speed of the first and second track respectively, the guide having guide members cooperating with the respective transfer units alternately, in such a way that over at least a part of the track of the transfer units along the respective stations the speed and position of these units are determined by the guide members while between these stations the transfer units are driven slidingly and at a higher speed.

5. Device according to claim 4, in which each transfer unit is provided with guide rolls cooperating with a guide track and with two clamping blocks, which are under spring pressure, and which cooperate with a circulating drive track which is driven at a higher speed.

6. Device according to claim 5, in which one of the clamping blocks is connected, for cancelling the spring pressure, to a pivotable release lever which is operable by coming up against a stop cam present on each transfer hook.

7. Device according to claim 1, in which the guide track of the transfer units is shifted outward over that part of its track which coincides with the path in which the overhanging members execute the downward motion.

8. Device according to claim 1, in which in the output station the hook track runs over a portion of an arc of a circle and in this portion cooperates with radially protruding drivers on the periphery of a carrier which is rotatable about a vertical axis and is coupled with guide members, located below it and provided with drivers for the transfer units, and in that in the said path an ejector rail is provided below the transfer unit and converging with the track thereof.

9. Device according to claim 1, in which the input station is provided with a driver which rotates about a vertical axis and is, over a portion of the first track, coupled thereto, the driver being connected to overhanging units located below it and arranging in a circle and the transfer unit guide members mounted below these, and that in the space enclosed by the overhanging units there is located a stationary control drum with control curves extending around its periphery, the lower control curve cooperating with a control cam at the end of the tilting arm of the overhanging member and the upper control curve cooperating with a control cam at the end of the tilting arm of the blocking member.

10. Device according to claim 1, in which the first hooks are the hooks, known per se, of an eviscerating line, and the second hooks are the hooks, known per se, of a refrigerating line, both belonging to an installation for the processing of slaughtered poultry.

* * * * *